J. LOTT.
Apparatus for Trimming the Edges of Straps, Bands, &c.
No. 148,617. Patented March 17, 1874.
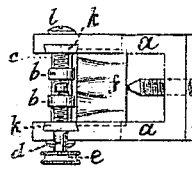
FIG. 1.
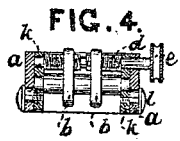
FIG. 4.
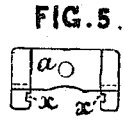
FIG. 5.
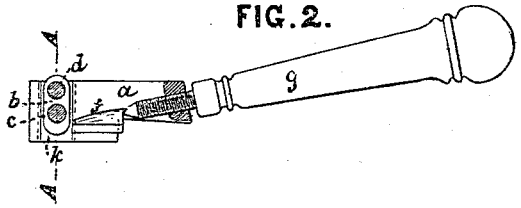
FIG. 2.
FIG. 6.
FIG. 8.
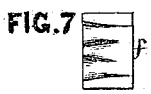
FIG. 7.
FIG. 9.
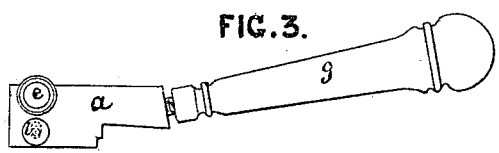
FIG. 3.
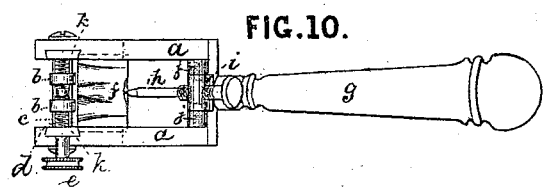
FIG. 10.
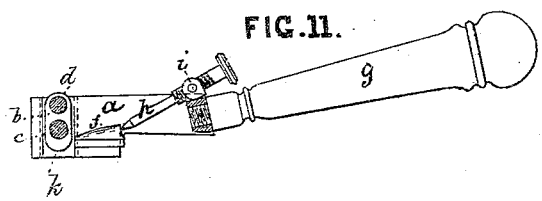
FIG. 11.
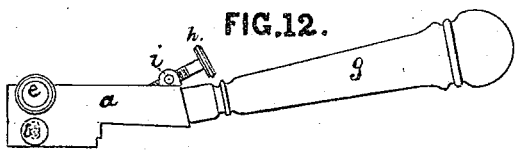
FIG. 12.
Witnesses
Inventor
James Lott
per L. W. Serrell
Atty
AM. PHOTO-LITHOGRAPHIC CO. N.Y. (OSBORNE'S PROCESS)

UNITED STATES PATENT OFFICE.

JAMES LOTT, OF LIVERPOOL, ENGLAND.

IMPROVEMENT IN APPARATUS FOR TRIMMING THE EDGES OF STRAPS, BANDS, &c.

Specification forming part of Letters Patent No. 148,617, dated March 17, 1874; application filed December 16, 1873.

*To all whom it may concern:*

Be it known that I, JAMES LOTT, of Liverpool, in the county of Lancaster, England, have invented new or Improved Appliances or Apparatus for Trimming the Edges of Straps, Bands, and other articles, of which the following is a specification:

Heretofore difficulty has been experienced in trimming by hand the edges of straps, bands, and other articles requiring to be trimmed or rounded off at the edges and ends. It has, moreover, been necessary to use several tools to do the work; at the same time considerable care and skill are required, while much time is also occupied in the process.

Now, according to my invention, I accomplish the required work by special new appliances or apparatus, whereby it is effected very much quicker, and in a much more effective and workmanlike manner, than heretofore.

Figure 1 is a plan, Fig. 2 vertical longitudinal section, Fig. 3 side elevation, Fig. 4 vertical cross-section, and Fig. 5 end elevation, of my trimming tool or appliance, which consists of a pronged frame, $a$, which may be conveniently made of brass. Between the two prongs of the frame $a$ there are two jaws, $b\ b$, mounted on, and free to move on, a fixed pin or bar, $c$, motion being communicated to the jaws $b\ b$ by turning a right-and-left-hand screw, $d$, in one direction or the other, (the screw being for that purpose formed with a head, $e$, with milled edges or other means for taking hold of it.) The jaws $b\ b$ are brought nearer together, or moved farther apart, and adjusted to the greatest nicety, as required, in accordance with the thickness of the strap or other article which is to be trimmed on the edge. Instead of the right-and-left-hand screw, which I have found to answer, other mechanical equivalent means may be employed for that purpose. For convenience of adjustment in the vertical direction, the jaws, with their screws $d$ and pin $c$, are mounted in slides $k$, and fit in corresponding dovetail-shaped recesses in the inner sides of the prongs. These slides $k$ are fixed in their position by means of a screw, $l$, on each side. By releasing these screws, the whole of this part of the apparatus can be raised or lowered to some slight but sufficient extent, the frame $a$ being formed with slots where the screws $l$ pass through the same for that purpose, as shown on Figs. 3 and 5. $f$ is a knife or cutter, which is held in the frame $a$ behind the jaws $b$. This knife is illustrated separately by Figs. 6, 7, 8, and 9, Fig. 6 being a longitudinal section; Fig. 7, a plan; Fig. 8, a back-end elevation; and Fig. 9, a front-end elevation. The cutting front edge is shaped to correspond with the shape to which it is required to trim the edge of the strap or other article. For harness-work, several cutters, made to correspond with different thicknesses of straps, would be required, all, however, made to fit the same pronged frame, and inserted in the same, as required. The cutter is retained in the frame in slots, as shown more particularly at $x\ x$, Fig. 5. The cutter is held firmly in position by the handle $g$, the lower part of which is screwed for that purpose, as shown, passing through the back of the frame, and caused to abut against the cutter $f$, thus holding it in position. By running the screwed end of the handle back a short distance, the cutter may be drawn out for the purpose of grinding, or for exchanging it for another size cutter, as required. The cutter may, however, conveniently be held in its place by other means than the one just described. One such other mode is here shown on Figs. 10, 11, and 12, of which Fig. 10 is a plan of a trimming-tool of a slightly-modified form, Fig. 11 a vertical longitudinal section of the same, and Fig. 12 a side elevation. The handle $g$ is here firmly secured to the pronged frame $a$, which is made somewhat longer than in the tool first described, in order to facilitate the action of the screw $h$. This screw $h$ serves to hold the cutter $f$ in position. It passes through the nut $i$, which is made so that it can turn on joint-pins from the two sides $j\ j$, forming a jaw or hinge on the back part of the top of the frame $a$. To release the cutter $f$, the screw $h$ is screwed back a turn or two. Its lower end can then be swung up free of the cutter, and the latter can be removed.

A much simpler trimming apparatus than those above described might be constructed, while still retaining some of the features of this part of the invention. Such an apparatus would be made with jaws, fixed or immovable as to their distance apart, in combination with the knife or cutter, as described, the other part of the apparatus remaining substantially the same. For each thickness of strap to be trimmed on the edge, a separate apparatus with its particular cutter would be requisite, thus necessitating several such apparatus instead of one suitable for all thicknesses, (because of the adjustable jaws and the facility for inserting different cutters.) As will be observed, the invention, when carried out in such manner, would not be so beneficial as when carried out as hereinbefore particularly described and shown; but I deem it useful to state the fact.

The material to be trimmed on the edge is placed in any suitable clamps or jaws, and evenly griped throughout its length, and tightly held in place. The cutting-tool above described can then be applied. It must, of course, first be properly adjusted to suit the width of strap required to be trimmed, and the depth of cut or thickness of shaving which it is desired to cut off. The former adjustment is done by the right-and-left-hand screw, as already referred to, and by the insertion of the proper cutter for the work to be done; and the latter adjustment is done by raising or lowering the jaw mechanism in the vertical direction, as already referred to. By running the tool thus properly adjusted once over the strap or other article requiring to be trimmed on the edge, this operation is performed in one stroke, and in a far more efficient way than heretofore by the now existing tools for that purpose. The strap or other article can then be blackened or otherwise finished, as required.

I claim—

1. An apparatus for trimming the edges of leather, provided with adjustable jaws $b$, their distance apart being regulated as required, in combination with a cutter or knife, $f$, held and fixed in the stock $a$, substantially as and for the purpose described.

2. The jaws $b$, constructed as specified, and adjusted by the screw $d$, as set forth.

3. The cutter $f$, held in the stock $a$, and made removable, as set forth, in combination with the guide jaws $b$, as specified.

4. An apparatus for trimming leather, made with movable jaws, adjustable both vertically and sidewise, and a cutter held and fixed in the apparatus, all substantially as described.

5. An apparatus for trimming leather, &c., with jaws adjustable vertically, and a cutter held and fixed in the apparatus, as described.

JAMES LOTT.

Witnesses:
 EDWD. GRIFFITH BREWER,
  89 *Chancery Lane*,
 J. B. WYNN,
  24 *Royal Exchange, London*.